G. HUTCHINSON.
WEIGHING SCALE.
APPLICATION FILED AUG. 25, 1911.
1,081,234.
Patented Dec. 9, 1913.
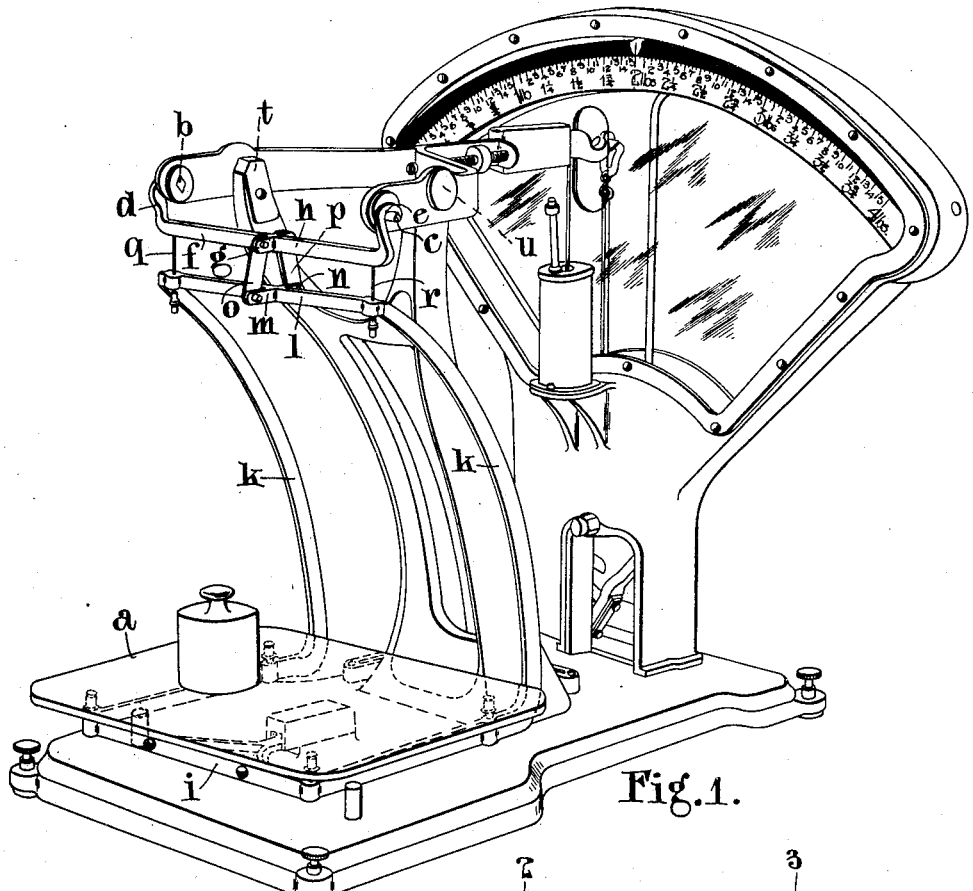
Fig. 1.
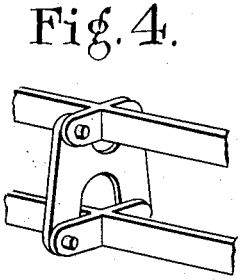
Fig. 4.
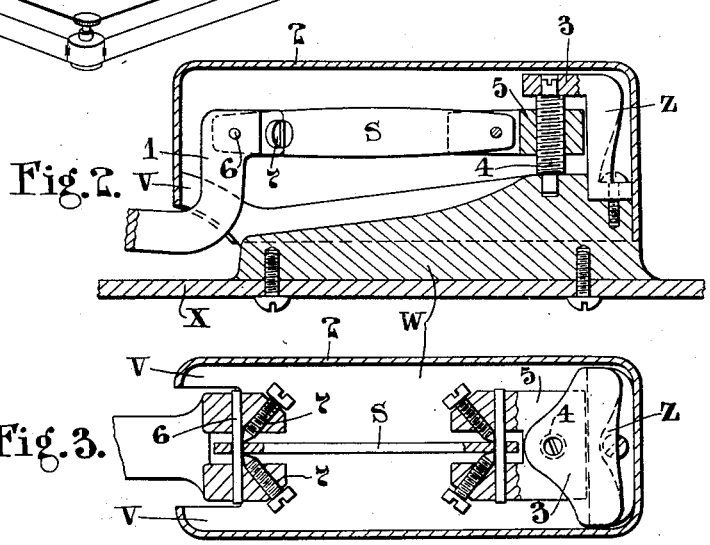
Fig. 2.
Fig. 3.
Witnesses.
Inventor.
George Hutchinson
By Munn & Co. Attorney.

UNITED STATES PATENT OFFICE.

GEORGE HUTCHINSON, OF CHRISTCHURCH, NEW ZEALAND.

WEIGHING-SCALE.

1,081,234. Specification of Letters Patent. Patented Dec. 9, 1913.

Application filed August 25, 1911. Serial No. 645,973.

*To all whom it may concern:*

Be it known that I, GEORGE HUTCHINSON, a subject of the King of Great Britain and Ireland, and residing at Hereford street, Christchurch, in the Provincial District of Canterbury, in the Dominion of New Zealand, have invented certain new and useful Improvements in or Relating to Weighing-Scales, of which the following is a specification.

This invention relates to improvements in weighing scales and has more particular reference to improved means for the suspension of the pan or platform upon which goods to be weighed are placed in a weighing scale.

The object of the invention is to obviate any undesirable relative movement between the suspending shackle or shackles and the knife edges upon which they are supported, and, further, to provide a simpler method of preventing the pan or the like from swinging than has been possible in weighing scales as hitherto constructed.

With this object in view the invention consists in the employment of a wide suspending shackle and flexible connections arranged, in a manner hereinafter described, between the suspending shackles and the pan hanger or platform grid, the provision of a single check link for preventing the swinging motion of the pan and other details hereinafter more particularly referred to.

The accompanying drawings illustrate one convenient mode of carrying out my invention.

Figure 1 is a perspective view showing one form of scale constructed in accordance with my invention. Fig. 2 is a sectional elevation of a detail and Fig. 3 is a plan of Fig. 2 with a portion removed. Fig. 4 is a fragmentary view illustrating a modified detail.

In carrying my invention into effect in one convenient manner as, for example, in its application to a weighing scale wherein is employed a cam and strap upon which is exerted an upward pull by the beam as described, for example, in British specification No. 14495 of 1909, the pan $a$ is suspended as is usual from a pair of knife edges $b$ $c$ or two sections of a knife edge in line with each other, but according to my invention these points of support are placed a considerable distance apart from one another. Supported upon the knife edges $b$ $c$ is a wide shackle comprising two end hooks $d$ $e$ adapted to rest upon the knife edges $b$ $c$ and connected by a longitudinal member $f$ from the middle of which and at right angles thereto two short projecting members $g$ $h$ are arranged horizontally. The pan grid $i$ is formed integral with or rigidly attached to two bent members or pan cranks $k$, the upper ends of which are rigidly connected by a longitudinal member $l$ arranged parallel to and at a short distance below the longitudinal member $f$, and provided with two cross members $m$ $n$ similar and similarly positioned to those on the member $f$. The cross-pieces in the respective longitudinal members $f$ and $l$ are connected by two comparatively thin flat strips $o$ $p$ of flexible metal or material extending downward from the shackle $f$ to the bent frame but slightly diverging from one another as shown and placed at such a distance apart from each other that their central lines fall upon an imaginary triangle, the apex of which is on the knife edge line and the base of which corresponds with the horizontal line of the pan grid. The flexible strips $o$ $p$ are placed in a plane at right angles to the knife edge line so that their flexibility allows the whole pan frame to swing with a motion of translation along the knife edge line, a further function of the strips being to prevent the back or front of the pan $a$ from dipping in such a manner as to disturb the imaginary triangle of which they form a part.

In addition to the diverging strips above mentioned I employ two vertical hangers $q$ $r$ which may be formed from stiff rods loosely connected to the longitudinal members $f$ and $l$ respectively, although, if desired, these supplementary hangers may be formed from flexible cords or pieces of resilient metal. The hangers $q$ $r$ which are preferably placed one at each end of the longitudinal members referred to, do not prevent the endwise motion of the pan hanger allowed by the flexible strips, but they prevent the pan from dipping at either of its ends, and they further coöperate with the aforesaid flexible strips to allow of the pan twisting to a small degree upon a vertical axis without causing the shackle hooks $d$ and $e$ to move upon their respective knife edges during such twisting, that is to say, the two hangers $q$ $r$ and the two strips $o$ $p$ together form, as it were, a turntable whereby any twisting motion of the whole pan frame is absorbed and is therefore not transmitted to the shackle. Where sheet metal strips are employed they may, if found desirable, be extended to meet each other at their middle portions, as shown in Fig. 4, in which case they form a rigid brace preventing distortion in any direction in their plane. The forms of these central braces in which resilient sheet metal is used have the advantage that they further act as springs tending to assist the force of gravity in returning the pan to its normal position whenever it has been twisted.

The pan suspended in the manner above described may be used without any check-links at all in which case it will swing sidewise only and the arrangement above described will absorb all other undesirable motions as hereinbefore explained, but when it is desired to prevent the pan from swinging at all the present construction allows of a very simple method of effecting this object.

It will be seen that whereas it has always hitherto been found necessary where check-links are employed to prevent a hanging pan from swinging, to employ three such links two of which are parallel to each other (or a bifurcated link which is the equivalent of these two links) and a third one at right angles to the first two, I am now enabled to check all swing by a solitary link supplemented by a pair of stops.

Figs. 2 and 3 illustrate the preferred arrangement in which the single link $s$ is placed beneath the scale pan $a$ although it may be placed at the back thereof or in any other convenient position, its direction being at right angles to that of the knife edge line $b$ $c$ while the link itself is equal in length to and parallel to that part of the beam line which joins the pan knife edges $b$ $c$ to the fulcrum knife edges $t$ $u$ in the manner well known in the art. When it is placed beneath the pan it is preferably located so that its attachment to the pan grid is about the center of the grid. Shocks due to a load being thrown upon the pan from an end direction will cause the pan to swing endwise for the moment but it will always tend to return to its normal and correct position, and in order to prevent excessive movement due to such endwise shocks I employ a pair of stops $v$ placed one on either side of some convenient part of the grid close to the point at which the link $s$ is attached thereto, and in addition I may provide suitably positioned stops for the purpose of preventing excessive rotative movement around the first mentioned stops as center.

The whole construction hereinbefore described lends itself more conveniently than any other to the housing or otherwise protecting of the check-link system from moisture, wet salt or other corrosive agents, to the action of which it might be subjected, and in a convenient construction I provide a boss $w$ upon the base $x$ of the scale having its internal part hollowed and sloped (as shown at Fig. 2) to shed down any foreign matter that may tend to collect there, the fixed attachment $z$ for the check-link being secured to the boss while that part 1 of the pan grid $i$, to which the front end of said link is attached, is formed with a downward dip or goose-neck between the main part of the grid and such point of attachment, an oblong cap 2 of metal or other material being employed to fit down over the check-link and goose-neck on to the boss formed at the base of the scale. In this way complete protection from the action of corrosive agents is afforded to the check-link and its attendant mechanism.

In order to make the height of that end of the check-link, which is attached to the base of the scale, readily adjustable I employ in the place of the usual stud and back nuts a bracket $z$ having a vertical inner wall rising from the boss $w$ and bent over to form a lip 3 which is adapted to hold a vertical screwed rod 4 in position. The screwed rod is provided with shoulders at each end which engage respectively with the boss $w$ and the lip 3, the latter being provided with a hole or aperture therethrough to receive the screwed rod upon which is threaded a block 5 of metal having a flat face in sliding contact with the flat face on the bracket $z$. Convenient means are provided for enabling the screwed spindle or rod 4 to be rotated when required as, for example, a slotted or squared end, the arrangement being such that upon rotation of the spindle in one direction or the other the block and with it that end of the check-link which it carries is moved in an upward or downward direction as desired, while the block itself is prevented from any rotational movement. The check-link $s$ may be attached to its supporting members by means of hardened steel pins 6 and these pins are supplemented by what are termed "frictions," but I prefer to form said frictions from screws 7, whose hardened points are made cone-shaped, and subtend an angle of, say 50 degrees, the screws themselves being set horizontally into the supporting members for the link as shown at an angle of preferably 40 degrees to the hardened steel pin so that there is thus an angle of divergence of, say, 10 degrees between the link and the sides of the conical points which happen to be opposite thereto.

It will be understood that while I have described one construction as an example of one application of my invention I may modify the details of such construction and the arrangement of the various parts to suit the particular type of weighing scale to which my invention is to be applied and to the particular purpose for which it is to be employed.

Having now described my invention what I claim as new and desire to secure by Letters Patent is:—

1. A weighing scale comprising a forked beam, a load knife edge upon each arm of the forked beam, a shackle supported upon said knife edges, a support for the device upon which the material to be weighed is placed, and means for securing the shackle to said support which as a whole are flexible only in the direction of the length of the shackle.

2. A weighing scale comprising a forked beam, a load knife edge upon each arm of the forked beam, a shackle supported upon said knife edges, a support for the device upon which the material to be weighed is placed, means for securing the shackle to said support which as a whole are flexible only in the direction of the length of the shackle while allowing rotation of the support, and stops for limiting the amount of such rotative movement.

3. A weighing scale, comprising a forked beam, a load knife edge upon each arm of the forked beam, a shackle supported upon said knife edges, a support for the device upon which the material to be weighed is placed, and flexible metallic strips set in a plane at right angles to said shackle, and connecting said shackle with said support.

4. A weighing scale comprising a forked beam, a load knife edge upon each arm of said forked beam, a shackle supported upon said knife edges, a support for the device upon which the material to be weighed is placed, two strips of flexible metal connecting said shackle with said support and diverging from one another.

5. A weighing scale, comprising a forked beam, a load knife edge upon each arm of said forked beam, a shackle supported upon said knife edges, a support for the device upon which the material to be weighed is placed, two strips of flexible metal connecting said shackle with said support and diverging from one another in such a way that their center lines form the sides of an imaginary triangle whose apex is upon the knife edge line.

6. A weighing scale comprising a forked beam, a load knife edge upon each arm of the forked beam, a shackle supported upon said knife edges, a support for the device upon which the material to be weighed is placed, flexible strips situated at the center of the shackle and in a plane at right angles to said shackle, said strips connecting the shackle to said support.

7. A weighing scale comprising a forked beam, a load knife edge upon each arm of the forked beam, a shackle supported upon said knife edges, a support for the device on which the material to be weighed is placed, two flexible strips situated at the center of the shackle and diverging from one another, said strips connecting the shackle to said support and supplementary hangers at each end of the shackle connecting said shackle to said support.

8. A weighing scale comprising a forked beam, a load knife edge upon each arm of the forked beam, a shackle supported upon said knife edges, a support for the device upon which the material to be weighed is placed, flexible strips situated at the middle of the shackle and diverging from one another, said strips being located in the plane at right angles to the shackle and serving to connect said shackle to said support and a check-link for said support.

9. A weighing scale comprising a forked beam, a load knife edge upon each arm, a shackle supported upon said knife edges, a support for the device upon which the material to be weighed is placed, diverging flexible strips connecting the middle of the shackle to said support, supplementary hangers at each end of said shackle and a check-link for said support.

10. A weighing scale comprising a forked beam, a load knife edge upon each arm of said beam, a shackle supported upon said knife edges, a support for the device upon which the material to be weighed is placed, diverging flexible strips connecting the middle of said shackle to said support, a link attached to said support and to the scale frame and means for adjusting the level of the link.

11. A weighing scale comprising a forked beam, a load knife edge upon each arm of said beam, a shackle supported upon said knife edges, a support for the device upon which the material to be weighed is placed, diverging flexible strips connecting the middle of said shackle to said support, a link attached to said support, a block to which one end of said link is attached and a screwed spindle for adjusting the height of said block.

12. A weighing scale comprising a forked beam, a load knife edge upon each arm of the forked beam, a shackle supported upon said knife edges, a support for the device upon which the material to be weighed is placed, diverging flexible strips connecting the middle of said shackle to said support, a boss upon the base of said scale, a bracket fixed to said boss and a check-link having one end secured to said support and the other end carried from said bracket.

13. A weighing scale comprising a forked beam, a load knife edge upon each arm of the forked beam, a shackle supported upon said knife edges, a support for the device upon which the material to be weighed is placed, diverging flexible strips connecting the middle of said shackle to said support, a boss upon the base of said scale, a bracket fixed to said boss, a check link having one end secured to said support and the other end carried from said bracket and a cap adapted to fit over the check-link on to the boss.

14. A weighing scale comprising a forked beam, a load knife edge upon each arm of the forked beam, a shackle supported upon said knife edges, a support for the device upon which the material to be weighed is placed, diverging flexible strips connecting the middle of said shackle to said support, a boss upon the base of said scale, a bracket fixed to said boss, a check link having one end carried from said bracket, an arm having an upturned end and connecting the other end of the check-link with said support, and a cap adapted to fit over the check link and the upturned end of the arm.

15. A weighing scale comprising a forked beam, a load knife edge upon each arm of the forked beam, a shackle supported upon said knife edges, a support for the device upon which the material to be weighed is placed and having a member arranged adjacent to and approximately parallel with said shackle, and flexible metallic strips set in a plane at right angles to said shackle and connecting said shackle with said support.

In testimony whereof I have signed my name to this specification in the presence of two subscribing witnesses.

GEORGE HUTCHINSON.

Witnesses:
T. S. COLE,
B. H. MATTHEWS.

---

Copies of this patent may be obtained for five cents each, by addressing the "Commissioner of Patents, Washington, D. C."